United States Patent [19]

Cincotta et al.

[11] 4,408,022
[45] Oct. 4, 1983

[54] BLEND OF POLYALKYLENE TEREPHTHALATE AND WHOLLY AROMATIC POLYESTER AND PROCESS FOR PRODUCING THE SAME

[75] Inventors: David E. Cincotta, South Orange; Frank M. Berardinelli, Millington, both of N.J.

[73] Assignee: Celanese Corporation, New York, N.Y.

[21] Appl. No.: 330,987

[22] Filed: Dec. 15, 1981

[51] Int. Cl.$^3$ ............................................. C08L 67/00
[52] U.S. Cl. ................................................... 525/444
[58] Field of Search ........................ 525/444; 524/539

[56] References Cited

U.S. PATENT DOCUMENTS

| 4,161,470 | 7/1979 | Calundann | 524/599 |
| 4,184,996 | 1/1980 | Calundann | 524/605 |
| 4,256,624 | 3/1981 | Calundann | 524/599 |

FOREIGN PATENT DOCUMENTS 2008598A 6/1979 United Kingdom .

*Primary Examiner*—J. Ziegler
*Attorney, Agent, or Firm*—Burns, Doane, Swecker & Mathis

[57] ABSTRACT

A process is provided for forming a novel polymer blend which exhibits an anisotropic melt phase wherein there is chemical interaction between previously formed polymeric blend components to yield a product which is capable of forming shaped articles having highly satisfactory mechanical properties. The process comprises intimately mixing together approximately 50 to 75 percent by weight of polyalkylene terephthalate and 25 to 50 percent by weight of a melt processable polyester which is capable of forming an anisotropic melt phase. A post-polymerization subsequently is conducted in the solid phase in a non-oxidizing atmosphere at a temperature within the range of approximately 250° to 300° C. for a period of time in the range approximately 8 to 72 hours to yield the desired chemical interaction between the previously formed polymeric blend components.

8 Claims, No Drawings

BLEND OF POLYALKYLENE TEREPHTHALATE AND WHOLLY AROMATIC POLYESTER AND PROCESS FOR PRODUCING THE SAME

BACKGROUND OF THE INVENTION

In one aspect, the present invention relates to a process for producing a blend of polyalkylene terephthalate and melt processable wholly aromatic polyester. In another aspect, the present invention relates to an improved blend of wholly aromatic polyester and polyalkylene terephthalate. The characteristics and properties of such a blend differ significantly from those expected in light of observations of the properties of ordinary mixtures and of most polymeric blends.

When a blend or mixture is prepared from two or more ordinary, non-polymeric materials, a random distribution of the molecules of the components is obtained. This random distribution provides complete mixing without the formation of groups or clusters of the molecules of any one component. Such a mixture is expected to follow the "Rule of Mixtures". The Rule of Mixtures predicts the numerical values of properties, such as tensile and flexural strengths and tensile and flexural moduli, of a blend to be the weighted average of the numerical values of the properties of the components.

A discussion of the Rule of Mixtures can be found in the book *Predicting the Properties of Mixtures: Mixture Rules in Science and Engineering*, by Lawrence E. Nielsen, Marcel Dekker Inc. (New York).

Further information with regard to the Rule of Mixtures can be found on pages 395, 436, 465, 492, and 500 of Volume 2 of *Mechanical Properties of Polymers and Composites*, by Lawrence E. Nielsen, Marcel Dekker Inc. (New York: 1974). As stated therein, mixtures of a polymer matrix with a fibrous reinforcing agent, a ribbon-shaped filler, or a rod-shaped filler are known to follow the Rule of Mixtures. The above-cited reference further discloses that mixtures of phase inverted isotropic interpenetrating polymer networks, such as a phase inverted network of polystyrene and polybutadiene, are also known to follow the Rule of Mixtures.

Mixtures of most chemically distinct polymeric materials have been found to deviate from the behavior of ordinary mixtures as characterized by the Rule of Mixtures. The sheer size of polymeric chains restricts mixing of the components and leads to the formation of domains or clusters of molecules of the individual components. Thus, it can be said that most chemically distinct polymeric materials tend to be incompatible in mixtures, exhibiting a tendency to separate into phases. There exists a boundary between the domains of the component polymers, and articles made from such a blend would be expected to exhibit failure at the boundary when placed under stress. In general, then, the mechanical properties of the product are commonly reduced rather than enhanced. Specific properties which may be thus affected include tensile strength, tensile modulus, flexural strength, flexural modulus, and impact strength.

Some polymeric materials exhibit an ordered structure in at least some regions of the polymer. This order can exist in one, two, or three dimensions. The inclusion in blends of polymeric materials exhibiting an ordered structure leads to an increased tendency of the blends to separate into phases. This is due to the fact that the order found in certain regions of the polymer causes a fairly sharp boundary between the domains of the molecules of the component polymers. Thus, blends including such polymers would be expected to exhibit a significant reduction in mechanical properties. Accordingly, there has been little impetus to form such blends, particularly for use in applications where mechanical properties are of importance.

U.S. Pat. No. 4,228,218 discloses a polymer composition comprising 20 percent or less, based upon the total weight of polymeric material, of a first rigid polymeric material with the balance being a second polymeric material composed substantially of flexible molecular chains. The first polymeric material is dispersed in the second polymeric material in a microscopic region of 1 $\mu$m. or less. Foreign counterparts of this application include Japan Pat. No. 54065747, French Pat. No. 2407956, West German Pat. No. 2847782, and British Pat. No. 2,008,598A.

Commonly assigned U.S. application Ser. No. 158,547, filed June 11, 1980, entitled "Blend of Polyalkylene Terephthalate and Wholly Aromatic Polyester," discloses a blend which comprises approximately 5 to approximately 75 percent by weight of a polyalkylene terephthalate and approximately 25 to approximately 95 percent by weight of a melt processable wholly aromatic polyester. However, the blend there exemplified utilized wholly aromatic polyester of relatively low molecular weight which had not been subjected to post-polymerization. Moreover, there is no indication that the blend contained chemical interaction between the blend components as is required in the process and product of the present invention.

Commonly assigned U.S. application Ser. No. 330,998, filed Dec. 15, 1981, entitled "Blend of Polyalkylene Terephthalate and High Molecular Weight Wholly Aromatic Polyester and Process for Producing the Same" (Inventors: David E. Cincotta and Frank M. Berardinelli), discloses a blend which comprises approximately 5 to 15 percent by weight of a polyalkylene terephthalate and 85 to 95 percent by weight of a wholly aromatic polyester, the wholly aromatic polyester having been subjected prior to blending to post-polymerization so as to increase the inherent viscosity thereof by at least approximately 50 percent. The compositional ranges of the blend and the sequence of steps of the process there disclosed differ significantly from those of the blend and process of the present invention.

See also European Patent Application No. 30,417, published June 17, 1981 and entitled "Compositions of Melt-Processable Polymers Having Improved Processability and Method of Processing."

At the time the present invention was made, it was known to increase the molecular weight, as indicated by an increase in inherent viscosity, of wholly aromatic polyester by subjecting the wholly aromatic polyester to a post-polymerization process, such as solid state polymerization, as illustrated in Example II of commonly assigned U.S. Pat. No. 4,161,470. It was further known that high molecular weight wholly aromatic polyester often exhibited better properties than low molecular weight wholly aromatic polyester. However, at the time the present invention was made it was not obviously apparent that higher molecular weight polyesters would be particularly desirable for blending with polyalkylene terephthalates, since the melting temperature of the wholly aromatic polyester tends to increase with increasing molecular weight and the increased molecular weight could possibly impede the desired admixture of the polymer components or otherwise impede processing stability thereby resulting in poorer blend properties.

It is therefore an object of the present invention to provide a process for producing a blend of polyalkylene terephthalate and wholly aromatic polyester which exhibits satisfactory mechanical properties, such as tensile strength, tensile modulus, flexural strength, flexural modulus, and impact strength.

It is also an object of the present invention to provide a process for producing a blend of polyalkylene terephthalate and wholly aromatic polyester which exhibits no significant reduction in mechanical properties as compared to the weighted average of the mechanical properties of the individual components.

It is also an object of the present invention to provide a blend of polyalkylene terephthalate and wholly aromatic polyester which exhibits satisfactory mechanical properties, such as tensile strength, tensile modulus, flexural strength, flexural modulus, and impact strength.

It is also an object of the present invention to provide a blend of polyalkylene terephthalate and wholly aromatic polyester which exhibits no significant reduction in mechanical properties as compared to the weighted average of the mechanical properties of the individual components.

It is also an object of the present invention to provide a blend of polyalkylene terephthalate and wholly aromatic polyester which exhibits a high degree of anisotropy in the melt.

It is a further object of the present invention to provide an improved polymer blend comprising a wholly aromatic polyester which can be more economically produced without a substantial reduction in mechanical properties.

These and other objects and advantages will be apparent to those skilled in the art from the following detailed description and appended claims.

SUMMARY OF THE INVENTION

In one aspect of the present invention, a process for producing a polymer blend which exhibits an anisotropic melt phase and is capable of forming shaped articles having satisfactory mechanical properties is provided. The process comprises the steps of:

(a) intimately mixing together approximately 40 to 90 percent by weight of a polyalkylene terephthalate and approximately 10 to 60 percent by weight of a melt processable wholly aromatic polyester which is capable of forming an anisotropic melt phase apart from the blend, and (b) subsequently subjecting the blend thus formed to post-polymerization, the post-polymerization being conducted at a temperature and for a period of time sufficient to cause chemical interaction between the blend components.

In another aspect of the present invention, a polymer blend which is capable of exhibiting an anisotropic melt phase and the ability to form shaped articles having satisfactory mechanical properties is provided. The blend comprises approximately 40 to 90 percent by weight of a polyalkylene terephthalate and approximately 10 to 60 percent by weight of a melt processable wholly aromatic polyester which is capable of forming an anisotropic melt phase apart from the blend, wherein there exists chemical interaction between the polyalkylene terephthalate continuous phase and the wholly aromatic polyester disperse phase of the blend.

DETAILED DESCRIPTION OF THE INVENTION

The present invention provides an improved blend of polyalkylene terephthalate and melt processable wholly aromatic polyester and a process for producing the same. As used herein, the term "blend" includes any physical blend, mixture, or alloy of the above polymeric components. More specifically, the term "blend" as used herein refers to a physical admixture of a polyalkylene terephthalate component and a wholly aromatic polyester component which includes chemical interaction between the components, as described more fully below.

The wholly aromatic polyesters which may be used as a component in the blend and as a starting material in the process of the present invention comprise at least two recurring moieties which, when combined in the polyester, have been found to form an atypical anisotropic melt phase. The aromatic polyesters are considered to be "wholly" aromatic in the sense that each moiety present in the polyester contributes at least one aromatic ring to the polymer backbone.

Wholly aromatic polyester resins long have been known. For instance, 4-hydroxybenzoic acid homopolymer and copolymers have been provided in the past and are commercially available. Certain of the wholly aromatic polyesters encountered in the prior art tend to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty. It is to be understood that the wholly aromatic polyesters which are suitable for use in the present invention are limited to those which are capable of undergoing melt processing, i.e., those which exhibit no substantial decomposition at or below the melting temperature.

In addition to being wholly aromatic and capable of undergoing melt processing, the polyesters which are useful in the present invention must exhibit, apart from the blend, optical anisotropy in the melt. Recent publications disclosing such polyesters include (a) Belgian Pat. Nos. 828,935 and 828,936, (b) Dutch Pat. No. 7505551, (c) West German Pat. Nos. 2,520,819; 2,520,820; 2,722,120; 2,834,535; 2,834,536; and 2,834,537, (d) Japanese Pat. Nos. 43-223, 2132-116, 3017-692, and 3021-293, (e) U.S. Pat. Nos. 3,991,013; 3,991,014; 4,057,597; 4,066,620; 4,067,852; 4,075,262; 4,093,595; 4,118,372; 4,130,702; 4,146,702; 4,153,779; 4,156,070; 4,159,365; 4,169,933; 4,181,792; 4,183,895; 4,188,476; 4,201,856; 4,226,970; 4,228,218; 4,232,143; 4,232,144; 4,238,600; 4,245,082; 4,245,084; 4,247,514; 4,267,289; and 4,269,965; and (f) U.K. application Nos. 2,002,404 and 2,030,158A.

Wholly aromatic polyesters which are preferred for use in the present invention are disclosed in commonly-assigned U.S. Pat. Nos. 4,067,852; 4,083,829; 4,130,545; 4,161,470; 4,184,996; 4,219,461; 4,224,433; 4,130,817;

4,238,598; 4,238,599; 4,245,084; 4,256,624; 4,265,802; and 4,279,803; and in commonly-assigned U.S. application Ser. Nos. 91,003, filed Nov. 5, 1979 (now U.S. Pat. No. 4,337,191); 109,575, filed Jan. 4, 1980 (now U.S. Pat. No. 4,285,852); 128,759, filed Mar. 10, 1980 (now U.S. Pat. No. 4,299,756); and 169,014, filed July 15, 1980 (now U.S. Pat. No. 4,337,190). The disclosures of all of the above-identified commonly-assigned U.S. patents and applications are herein incorporated by reference. The wholly aromatic polyesters disclosed therein typically are capable of forming an anisotropic melt phase apart from the blend at a temperature below approximately 350° C.

The wholly aromatic polyesters which are suitable for use in the present invention may be formed by a variety of ester-forming techniques whereby organic monomer compounds possessing functional moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly-assigned U.S. Pat. No. 4,083,829, entitled "Melt Processable Thermotropic Wholly Aromatic Polyester," is described a slurry polymerization process which may be employed to form the wholly aromatic polyesters which are suitable for use in the present invention. According to such a process, the solid product is suspended in a heat exchange medium. The disclosure of this patent has previously been incorporated herein by reference.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters suitable for use in the present invention tend to be substantially insoluble in common polyester solvents and accordingly are not susceptible to solution processing. As discussed previously, they can be readily processed by common melt processing techniques. Most suitable wholly aromatic polyesters are soluble in pentafluorophenol.

The wholly aromatic polyesters which are suitable for use in the present invention commonly exhibit a weight average molecular weight (as prepared) of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in pentafluorophenol solution may be employed to determine the molecular weight.

The wholly aromatic polyesters additionally commonly exhibit an inherent viscosity (i.e., I.V.) of at least approximately 2.0 dl./g. when dissolved in a concentration of 0.1 weight/volume percent in pentafluorophenol at 60° C.

For the purposes of the present invention, the rings which are included in the polymer backbones of the polymer components commonly may include substitution of at least some of the hydrogen atoms present upon a ring. Such substituents include alkyl groups of up to five carbon atoms; alkoxy groups having up to five carbon atoms; halogens, and additional aromatic rings, such as phenyl and substituted phenyl groups. Halogens which may be listed as possible substituents include fluorine, chlorine, and bromine. Although bromine atoms tend to be released from organic compounds at high temperatures, bromine is more stable on aromatic rings than on aliphatic chains, and therefore is suitable for inclusion as a possible substituent on the rings.

The above-described polyesters, in order to be useful in the blend of the present invention, must exhibit optical anisotropy in the melt phase. These polyesters readily form liquid crystals in the melt phase and accordingly exhibit a high tendency for the polymer chains to orient in the shear direction. Such anisotropic properties are manifested at a temperature at which the wholly aromatic polyesters readily undergo melt processing to form shaped articles. The anisotropic properties may be confirmed by conventional polarized light techniques whereby crossed-polarizers are utilized. More specifically, the anisotropic melt phase may conveniently be confirmed by the use of a Leitz polarizing microscope at a magnification of 40× with the sample on a Koffler hot stage and under a nitrogen atmosphere. The melt phases of the wholly aromatic polyesters which are suitable for use in the present invention are optically anisotropic, i.e., they transmit light when examined between crossed-polarizers. By contrast, the melt of a conventional polymer will not appreciably transmit light when placed between crossed-polarizers.

The wholly aromatic polyesters described above are useful as molding resins and may also be used in the formation of coatings, fibers, and films. They may be molded by injection molding and can be processed by any melt extrusion technique.

Especially preferred wholly aromatic polyesters are those which are disclosed in U.S. Pat. Nos. 4,161,470; 4,184,996; and 4,256,624.

The polyester disclosed in U.S. Pat. No. 4,161,470 is a melt processable wholly aromatic polyester which is capable of forming an anisotropic melt phase at a temperature below approximately 350° C. apart from the blend. The polyester consists essentially of the recurring moieties I and II which may include substitution of at least some of the hydrogen atoms present upon an aromatic ring wherein:

I is 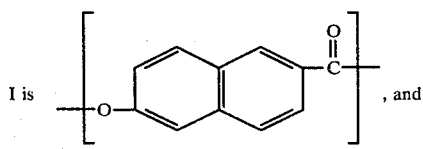, and

II is 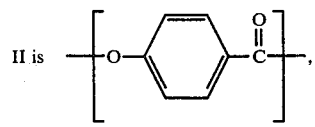

with said optional substitution if present being selected from the group consisting of an alkyl group of 1 to 4 carbon atoms, an alkoxy group of 1 to 4 carbon atoms, halogen, and mixtures of the foregoing. The wholly aromatic polyester there disclosed comprises approximately 10 to 90 mole percent of moiety I and approximately 10 to 90 mole percent of moiety II.

The polyester disclosed in U.S. Pat. No. 4,184,996 is a melt processable wholly aromatic polyester which is capable of forming an anisotropic melt phase at a temperature below approximately 325° C. apart from the blend. The polyester consists essentially of the recurring moieties I, II, and III wherein:

I is 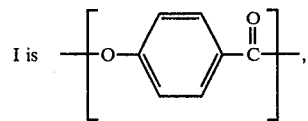,

II is 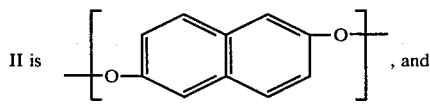, and

III is 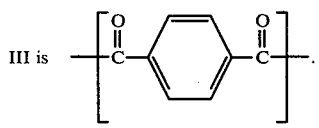.

The wholly aromatic polyester there disclosed comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. Each of the moieties of the polyester is free of ring substitution.

The polyester disclosed in U.S. Pat. No. 4,256,624 is a melt processable wholly aromatic polyester capable of forming an anisotropic melt phase at a temperature below approximately 400° C. apart from the blend. The polyester consists essentially of the recurring moieties I, II, and III which may include substitution of at least some of the hydrogen atoms present upon an aromatic ring wherein:

I is 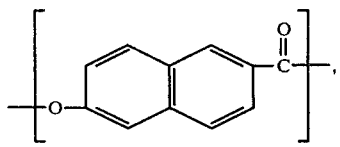,

II is a dioxyaryl moiety of the formula

, where Ar is a divalent radical comprising at least one aromatic ring, and III is a dicarboxyaryl moiety of the formula

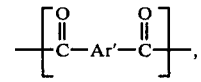, where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group, and mixtures of the foregoing. The polyester comprises approximately 10 to 90 mole percent of moiety I, approximately 5 to 45 mole percent of moiety II, and approximately 5 to 45 mole percent of moiety III.

The polyalkylene terephthalates which are useful in the present invention are available commercially or can be prepared by known techniques, such as by the alcoholysis of esters of terephthalic acid with alkylene glycols and subsequent polymerization, by heating the glycols with the free acids or with halide derivatives thereof, and similar processes. These are described in U.S. Pat. Nos. 2,465,319 and 3,047,539, which are herein incorporated by reference.

The alkylene units of the polyalkylene terephthalates which are suitable for use in the present invention contain from 2 to 5 carbon atoms. The alkylene units preferably contain 2 to 4 carbon atoms. Polybutylene terephthalate (prepared from 1,4-butanediol) and polyethylene terephthalate are the preferred polyalkylene tetraphthalates for use in the present invention. Other suitable polyalkylene terephthalates include polypropylene terephthalate, polyisobutylene terephthalate, polypentyl terephthalate, polyisopentyl terephthalate, and polyneopentyl terephthalate. As indicated by the examples listed above, the alkylene units may be straight chains or branched chains.

The process of the present invention is useful for producing a polymer blend which exhibits an anisotropic melt phase and is capable of forming shaped articles having satisfactory mechanical properties. The process comprises first intimately mixing together approximately 40 to 90 percent by weight of a polyalkylene terephthalate and appoximately 10 to 60 percent by weight of a wholly aromatic polyester. Preferably, approximately 50 to 75 percent by weight of polyalkylene terephthalate is intimately mixed with approximately 25 to 50 percent by weight of wholly aromatic polyester.

While any method known in the art of mixing the polymer components may be utilized, a convenient method is melt extrusion. The individual components are preferably provided in particulate form (e.g., powder, pellets, chips, etc.). Each of the components is weighed separately, and then the components are physically mixed together in any appropriate apparatus, e.g., a ball mill or ribbon mill. The physical mixture is then dried at approximately 100° C. overnight or for a period of time of approximately 24 hours. The mixture is conveniently dried in a vacuum oven or in a circulating air oven, although any suitable apparatus may be used. The purpose of the drying step is to remove water from the physical mixture so as to prevent degradation of the polymer blend. The mixture of polymer chips is then provided to an extruder, e.g., a single or twin screw extruder. The extrusion apparatus thoroughly mixes the polymers in the melt and then extrudes the blend in the form of a strand which, upon solidification, can be broken up into chips.

The process of the present invention further comprises, subsequently to intimately mixing the components, subjecting the blend thus formed to post-polymerization. The post-polymerization is conducted at a temperature and for a period of time sufficient to cause chemical interaction between the blend components, and does not result during conventional melt processing of the blend to form a molded article such as described in commonly assigned U.S. application Ser. No. 158,547, filed June 11, 1980.

While not wishing to be bound by theoretical considerations, it is believed that the chemical interaction which occurs may be characterized as an ester interchange reaction. Such a reaction would lead to the formation of relatively short-segmented polyalkylene terephthalate/wholly aromatic polyester block copolymer linkages between phases of the blend. Thus, the blend would comprise a continuous polyalkylene terephthalate phase chemically bound to a disperse wholly aromatic polyester phase, thereby improving the adhesion between the phases. The wholly aromatic polyester phase thereby becomes a much more effective reinforcement for the continuous polyalkylene terephthalate phase. The chemical bonding which is believed to occur is caused by the post-polymerization. The post-polymerization may also serve to increase the molecular weight of the wholly aromatic polyester and/or polyalkylene terephthalate component.

The term "post-polymerization" as used herein refers to a procedure whereby the polymer components in the blend are further polymerized following an initial polymerization in which the highest molecular weight practicable for each component is obtained. The molecular weight which may practicably be obtained by the initial polymerization is commonly limited by such factors as the viscosity of the polymer during the later stages of the initial polymerization, the polymerization time and rate, and the extreme reaction conditions required to complete the polymerization. Commonly, following the initial polymerization, but prior to post-polymerization, the individual polymers are commonly collected and extracted or otherwise purified and are then intimately mixed together as described above.

The post-polymerization may be conducted by any one of a variety of techniques. According to one post-polymerization procedure after the components are mixed together, the mixture in the melt phase is then transferred to a reactor which is suitable for use as a post-polymerization vessel, and melt polymerization is continued therein. For example, the mixture may be subjected to further polymerization in the melt in a screw extruder.

Another post-polymerization technique (which is preferred for use in the process of the present invention) is known as solid-state polymerization. According to such a technique, the mixture in the melt phase is allowed to cool and solidify and is thereafter ground up to a particulate form, e.g., into chips. The solid particulates of the polymer blend are then subjected to an elevated temperature below the melting temperature for a period of time sufficient to cause the desired chemical interaction. Preferably, the solid state polymerization is conducted under a non-oxidizing atmosphere, such as nitrogen, argon, helium, carbon dioxide, or a vacuum, although, less preferably, an oxygen-containing atmosphere might also be used. In preferred embodiments, the wholly aromatic polyester is subjected to a temperature within the range of approximately 250° C. to 300° C. for a period of time within the range of approximately 8 to 72 hours. More preferably, the wholly aromatic polyester is subjected to a temperature within the range of approximately 265° C. to 280° C. for a period of time of approximately 20 hours (e.g., from 16 to 24 hours).

The present invention further provides a novel polymer blend which is capable of exhibiting an anisotropic melt phase and the ability to form shaped articles having satisfactory mechanical properties. The blend comprises approximately 40 to 90 percent by weight of a polyalkylene terephthalate and approximately 10 to 60 percent by weight of a melt processable wholly aromatic polyester which is capable of forming an anisotropic melt phase apart from the blend. The blend contains chemical interaction between the polyalkylene terephthalate continuous phase and the wholly aromatic polyester disperse phase of the blend. The apparent nature of the chemical interaction has been discussed above with regard to the process of the present invention.

In preferred embodiments, the blend comprises approximately 50 to 75 percent by weight of the polyalkylene terephthalate and 25 to 50 percent by weight of the wholly aromatic polyester. The blend is preferably prepared by the process of the present invention, as described above. The polyalkylene terephthalates and wholly aromatic polymers which are preferred for use in the blend of the present invention have been discussed above with regard to the process of the present invention.

The blend of the present invention is capable of undergoing melt processing at a temperture within the range of approximately 260° C. to 350° C. Preferably, the blend is capable of undergoing melt processing at a temperature within the range of approximately 280° C. to 300° C.

The blend of the present invention demonstrates anisotropy in the melt phase. This is due to the fact that the wholly aromatic polyester has been found to retain its anisotropic characteristics in spite of the presence of the other component. Thus, the blend retains the excellent processability characteristics of the liquid crystalline polymer.

The blend of the present invention is useful as a molding resin, and especially for injection molding. The blend can also be used in the formation of fibers and films. Articles molded from the blend of the present invention exhibit good mechanical properties, such as tensile strength, tensile modulus, flexural strength, flexural modulus, notched Izod impact strength, and heat deflection temperature.

Articles may also be molded from a molding compound which includes, as one component, the blend of the present invention. Such a molding compound incorporates into the blend of the present invention approximately 1 to 50 percent, preferably approximately 10 to 30 percent, by weight, based upon the total weight of the molding compound, of a solid filler and/or reinforcing agent. Representative fibers which may serve as reinforcing media include glass fibers, asbestos, graphitic carbon fibers, amorphous carbon fibers, synthetic polymer fibers, aluminum fibers, aluminum silicate fibers, oxide of aluminum fibers, titanium fibers, magnesium fibers, rock wool fibers, steel fibers, tungsten fibers, cotton, wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc.

In order to form an article by injection molding from the present blend, or from a molding compound made from the present blend, the blend or molding compound is brought to the melting temperature of the blend, e.g., approximately 280° C. to 300° C., and is then injected into a mold cavity. The mold cavity is commonly maintained at a temperature of approximately 50 to 150° C. e.g., approximately 100° C. The blend in its melt phase is injected into the mold cavity at a pressure of approximately 10,000 p.s.i. The cycle time (i.e., the time between injections) for the present blend commonly is about 10 to 40 seconds.

The properties of articles formed from blend compositions of the present invention may be further improved by heat treatment. The articles may be thermally treated in an inert atmosphere (e.g., nitrogen, argon, helium) or alternatively a flowing oxygen-containing atmosphere (e.g., air). For instance, the article may be brought to a temperature approximately 10° C. to 30° C. below the melting temperature of the blend, at which temperature the article remains a solid object. The heat treatment times commonly range from a few minutes to a number of days, e.g., from 0.5 to 200 hours, or more. Preferably, the heat treatment is conducted for a time of 48 to 72 hours.

It has been observed that the properties of articles formed from the blend of the present invention vary with the processing conditions, such as mold temperature, injection pressure, cycle time, etc. However, those conditions which maximize the properties of articles formed from the present blend will become apparent to one of ordinary skill in the art.

As discussed above, it appears that the primary reason for the superior molding properties which are provided by the blend of the present invention is the improved adhesion between the continuous polyalkylene terephthalate phase and the disperse wholly aromatic polyester phase, which serves as a reinforcement for the continuous phase.

In contrast, it has been observed that blends of wholly aromatic polyester and polyalkylene terephthalate which have a lower concentration of polyalkylene terephthalate than the blend of the present invention (e.g., approximately 30 percent or less) and which are subjected to post-polymerization after blending exhibit depressed mechanical properties as compared to those of the blend of the present invention. This phenomenon may be due to an inversion of the phases. That is, at the relatively low polyalkylene terephthalate concentrations, the wholly aromatic polyester phase is the continuous phase, and the polyalkylene terephthalate phase is the disperse phase. Chemical interaction between the phases caused by post-polymerization after blending would have the effect of binding the continuous wholly aromatic polyester phase to the relatively weaker polyalkylene terephthalate disperse phase. The wholly aromatic polyester phase would be thereby bound to defects in the polymer structure which could concentrate stresses and yield a weaker composition.

Furthermore, it has been observed that the particular sequence of steps provided by the process of the present invention is critical in providing blends having satisfactory mechanical properties. That is, when wholly aromatic polyester is first post-polymerized and then intimately mixed with polyalkylene terephthalate in the same approximate concentrations as in the blend of the present invention, the mechanical properties of the blend are depressed. Such a blend is believed to exhibit two continuous phases, one of which is weak mechanically. The presence of two continuous phases may cause failures at low stresses.

Therefore, it is apparent that the blend of the present invention and the process for producing the same provide unexpected and surprising results. It has been observed that there is no significant reduction in mechanical properties of the blend when compared to the weighted average of the mechanical properties of the components.

The following Examples are given as specific illustrations of the invention. It should be understood, however, that the invention is not limited to the specific details set forth in the Examples.

EXAMPLE 1

This Example illustrates the preparation by the process of the present invention of a polymer blend from polyethylene terephthalate and wholly aromatic polyester. The polyethylene terephthalate was available commercially from the Celanese Corporation under the trademark PETPAC ® and exhibited an inherent viscosity (I.V.) of 0.74 dl./g. The wholly aromatic polyester comprised 60 mole percent of 6-oxy-2-naphthoyl moiety and 40 mole percent of p-oxybenzoyl moiety. The wholly aromatic polyester exhibited an I.V. of 4.88 dl./g. when measured at a concentration of 0.1 weight-/volume percent in pentafluorophenol at 60° C.

The wholly aromatic polyester was dry blended with the polyethylene terephthalate in weight ratios of polyethylene terephthalate: wholly aromatic polyester of 50:50, 75:25, and 90:10. The dry-blend was vacuum dried overnight at 100° C. to 120° C. The mixture was then melt-blended in a twin screw extruder at the lowest possible temperature. The resulting blend in the form of a solid strand was chipped and then vacuum dried. The chips were then solid state polymerized under nitrogen for 18 hours at 265° C. to produce chemical interaction between the blend components. The chips were then molded into test bars on an Arburg injection molding machine.

The mechanical properties of the blend were measured and are shown in Table I together with the properties of test bars molded from the wholly aromatic polyester and from the polyethylene terephthalate.

TABLE I

| Blend Composition (Polyethylene Terephthalate: Wholly Aromatic Polyester) | Tensile Strength (p.s.i.) | Elongation (%) | Tensile Modulus (p.s.i. × 10⁻⁶) | Flexural Strength (p.s.i.) | Flexural Modulus (p.s.i. × 10⁻⁶) | Notched Izod Impact Strength (ft.-lb./in.) |
|---|---|---|---|---|---|---|
| 0:100 | 25300 | 2.06 | 2.01 | 24500 | 1.48 | 2.47 |
| 50:50 | 15000 | 4.00 | 0.76 | 17500 | 0.73 | 0.49 |
| 75:25 | 8040/5350* | 3.18/38* | 0.39 | 12000 | 0.40 | 0.51 |
| 90:10 | 7910/8000* | 3.01/350* | 0.38 | 11600 | 0.37 | 0.54 |
| 100:0 | 7590/8500* | 3.26/430* | 0.35 | 11500 | 0.35 | 0.59 |

*yield/break

The tensile properties were determined in accordance with standard test ASTM D638, Type V; the flexural properties were determined in accordance with ASTM D790; and the notched Izod impact strength was determined in accordance with ASTM D256.

The data listed in Table I clearly demonstrate the surprising and unexpected results provided by the process and the blend composition of the present invention. A substantial decrease in properties from those of the weaker individual component, as might be expected, is not observed.

EXAMPLE 2

The Example illustrates the preparation by the process of the present invention of a polymer blend from polybutylene terephthalate (prepared from 1,4-butanediol) and the wholly aromatic polyester described in Example 1. The polybutylene terephthalate is available commercially from the Celanese Corporation under the trademark CELANEX® 2000.

The blend of the present Example was prepared in the manner described in Example 1. The components were blended in the same weight ratios as in Example 1.

Test bars were molded from the polymer blend in the manner described in Example 1. The mechanical properties of the test bars were measured according to the tests listed in Example 1. The results of the tests are given in Table II.

TABLE II

| Blend Composition (Polybutylene Terephthalate: Wholly Aromatic Polyester) | Tensile Strength (p.s.i.) | Elongation (%) | Tensile Modulus (p.s.i. × 10⁻⁶) | Flexural Strength (p.s.i.) | Flexural Modulus (p.s.i. × 10⁻⁶) | Notched Izod Impact Strength (ft.-lb./in.) |
|---|---|---|---|---|---|---|
| 0:100 | 25300 | 2.06 | 2.01 | 24500 | 1.48 | 2.47 |
| 50:50 | 23600 | 2.58 | 1.41 | 19300 | 0.96 | 0.65 |
| 75:25 | 16400 | 2.72 | 0.85 | 16400 | 0.62 | 0.50 |
| 90:10 | 10900 | 5.36 | 0.49 | 14100 | 0.43 | 0.59 |
| 100:0 | 7170/4760* | 3.36# | 0.35 | 13000(5%) | 0.38 | 0.39 |

*yield/break
at yield

The data listed in Table II again clearly demonstrate the surprising and unexpected results provided by the process and the blend of the present invention. The properties are well above those which would be predicted.

COMPARATIVE EXAMPLE 1

This Comparative Example illustrates the preparation of a polymer blend from the polyethylene terephthalate and the wholly aromatic polyester described in Example 1, using lower concentrations of the polyethylene terephthalate in the blend compositions than those utilized in the blend of the present invention.

The blend compositions of the present Comparative Example were prepared in the manner described in Example 1. The weight ratios of polyethylene terephthalate:wholly aromatic polyester were 10:90 and 25:75.

Test bars were molded from the blend compositions in the manner described in Example 1. The mechanical properties of the test bars were measured according to the tests listed in Example 1. The results of the tests are given in Table III.

TABLE III

| Blend Composition (Polyethylene Terephthalate: Wholly Aromatic Polyester) | Tensile Strength (p.s.i.) | Elongation (%) | Tensile Modulus (p.s.i. × 10⁻⁶) | Flexural Strength (p.s.i.) | Flexural Modulus (p.s.i. × 10⁻⁶) | Notched Izod Impact Strength (ft.-lb./in.) |
|---|---|---|---|---|---|---|
| 0:100 | 25300 | 2.06 | 2.01 | 24500 | 1.48 | 2.47 |
| 10:90 | 7980 | 0.84 | 1.01 | 8730 | 0.70 | 0.35 |
| 25:75 | 9250 | 1.66 | 0.68 | 10300 | 0.61 | 0.34 |
| 100:0 | 7590/8500* | 3.26/430* | 0.35 | 11500 | 0.35 | 0.59 |

*yield/break

It can clearly be seen from Table III that the blend compositions of the present Comparative Example, unlike those of the claimed invention, exhibit a marked decrease in properties from those exhibited by the wholly aromatic polyester. The flexural strength and notched Izod impact strength values are particularly depressed, falling below the corresponding values for the weaker individual component. Such results are typical of those ordinarily expected from polymer blends. In sharp contrast, the blend compositions of the present invention and the process of the present invention provide surprisingly and unexpectedly advantageous results, as illustrated by Example 1.

COMPARATIVE EXAMPLE 2

This Comparative Example illustrates the preparation of a polymer blend from the polybutylene terephthalate and the wholly aromatic polyester described in Example 2, using lower concentrations of the polybutylene terephthalate in the blend compositions than those utilized in the blend of the present invention.

The blend compositions of the present Comparative Example were prepared in the manner described in Example 2. The weight ratios of polybutylene terephthalate:wholly aromatic polyester were 10:90 and 25:75.

Test bars were molded from the blend compositions in the manner described in Example 1. The mechanical properties of the test bars were measured according to the tests listed in Example 1. The results of the tests are given in Table IV.

measured at a concentration of 0.1 weight/volume percent in pentafluorophenol at 60° C.

The post-polymerized wholly aromatic polyester was dry-blended with the polyethylene terephthalate in weight ratios of polyethylene terephthalate to wholly aromatic polyester of 10:90, 25:75, and 50:50. The physical mixture of solid particles was vacuum dried overnight at 100° C. to 120° C. The mixture was then melt-blended in a twin screw extruder at the lowest possible melt temperature. The resulting blend in the form of a solid strand was chipped and then vacuum dried. The chips were then molded into test bars on an Arburg injection molding machine.

The mechanical properties of the blend were measured as in Example 1, and the results are given in Table V.

TABLE V

| Blend Composition (Polyethylene Terephthalate: Wholly Aromatic Polyester) | Tensile Strength (p.s.i.) | Elongation (%) | Tensile Modulus (p.s.i. × $10^{-6}$) | Flexural Strength (p.s.i.) | Flexural Modulus (p.s.i. × $10^{-6}$) | Notched Izod Impact Strength (ft.-lb./in.) |
|---|---|---|---|---|---|---|
| 0:100 | 25800 | 2.20 | 2.08 | 24200 | 1.49 | 1.80 |
| 50:50 | 13700 | 1.47 | 1.15 | 16200 | 0.79 | 0.54 |
| 75:25 | 7100 | 1.90 | 0.46 | 10700 | 0.42 | 0.50 |
| 90:10 | 7760/7750* | 2.92/3.10* | 0.38 | 11800 | 0.37 | 0.54 |
| 100:0 | 7590/8500* | 3.26/430* | 0.35 | 11500 | 0.35 | 0.59 |

*yield/break

It can readily be seen from the data of Table V that,

TABLE IV

| Blend Composition (Polybutylene Terephthalate: Wholly Aromatic Polyester) | Tensile Strength (p.s.i.) | Elongation (%) | Tensile Modulus (p.s.i. × $10^{-6}$) | Flexural Strength (p.s.i.) | Flexural Modulus (p.s.i. × $10^{-6}$) | Notched Izod Impact Strength (ft.-lb./in.) |
|---|---|---|---|---|---|---|
| 0:100 | 25300 | 2.06 | 2.01 | 24500 | 1.48 | 2.47 |
| 10:90 | 15100 | 0.80 | 2.02 | 12600 | 1.27 | 1.19 |
| 25:75 | 4350 | 0.59 | 0.84 | 5940 | 0.63 | 0.54 |
| 100:0 | 7170/4760* | 3.36# | 0.35 | 13000(5%) | 0.38 | 0.39 |

*yield/break
at yield

It can be seen from Table IV that the blend compositions of the present Comparative Example, unlike those of the claimed invention, exhibit a marked decrease in properties from those exhibited by the wholly aromatic polyester. In certain instances (e.g., tensile strength and flexural strength of the 25:75 composition), the properties are even below those of the individual component exhibiting the poorer properties. Such results are typical of those ordinarily expected from polymer blends.

In contrast, the blend and the process of the present invention provide surprisingly and unexpectedly advantageous results, as illustrated by Example 2.

COMPARATIVE EXAMPLE 3

This Comparative Example illustrates the preparation of a polymer blend from the polyethylene terephthalate and the wholly aromatic polyester described in Example 1. The blend was prepared by a process similar to that of the present invention except that the sequence of steps was reversed.

Forty pounds of the wholly aromatic polyester in the form of chips was solid state polymerized under nitrogen for 18 hours at 265° C. During the solid state polymerization, the I.V. of the wholly aromatic polyester was increased from 4.88 dl./g. to 11.48 dl./g. when unlike the process of the present invention, the process of the present Comparative Example yields a blend having generally reduced properties. The properties of the 75:25 blend are generally below those of the weaker individual component. Such results are typical of those ordinarily expected. In contrast, the process of the present invention provides a blend having satisfactory mechanical properties, as illustrated by Example 1.

COMPARATIVE EXAMPLE 4

This Comparative Example illustrates the preparation of a polymer blend from the polybutylene terephthalate and the wholly aromatic polyester described in Example 2. The blend was prepared by a process similar to that of the present invention except that the sequence of steps was reversed.

The blend was prepared in the manner described in Comparative Example 3 from 50 weight percent of the wholly aromatic polyester of Example 1 and 50 weight percent of the polybutylene terephthalate of Example 2.

Tests bars were molded from the blend in the manner described in Example 1. The mechanical properties of the test bars were measured according to the tests listed in Example 1. The results of the tests are given in Table VI.

TABLE VI

| Blend Composition (Polybutylene Terephthalate: Wholly Aromatic Polyester) | Tensile Strength (p.s.i.) | Elongation (%) | Tensile Modulus (p.s.i. × 10⁻⁶) | Flexural Strength (p.s.i.) | Flexural Modulus (p.s.i. × 10⁻⁶) | Notched Izod Impact Strength (ft.-lb./in.) |
|---|---|---|---|---|---|---|
| 0:100 | 25800 | 2.20 | 2.08 | 24200 | 1.49 | 1.80 |
| 50:50 | 7530 | 1.27 | 0.72 | 9950 | 0.58 | 0.34 |
| 100:0 | 7170/4760* | 3.36# | 0.35 | 13000(5%) | 0.38 | 0.39 |

*yield/break
at yield

It can readily be seen from the data of Table VI that, unlike the process of the present invention, the process of the present Comparative Example yields a blend having generally reduced properties. Such results are typical of those ordinarily expected and are undesirable. In contrast, the process of the present invention provides a blend having satisfactory mechanical properties, as illustrated by Example 2.

It is to be understood that the foregoing detailed description is given merely by way of illustration and that many variations may be made therein without departing from the spirit of the invention.

We claim:

1. A process for producing a polymer blend which exibits an anisotropic melt phase and is capable of forming shaped articles having satisfactory mechanical properties, said process comprising the steps of:
    (a) intimately mixing together approximately 50 to 75 percent by weight of a previously formed polyalkylene terephthalate and approximately 25 to 50 percent by weight of a previously formed melt processable wholly aromatic polyester which is capable of forming an anisotropic melt phase apart from the blend, and
    (b) subsequently subjecting the blend thus formed to post-polymerization, said post-polymerization being conducted in the solid phase in a non-oxidizing atmosphere at a temperature within the range of approximately 250° C. to 300° C. and for a period of time within the range of approximately 8 to 72 hours so as to cause chemical interaction between said previously formed polymeric blend components.

2. The process of claim 1 wherein said post-polymerization is conducted in the solid phase in a non-oxidizing atmosphere at a temperature within the range of approximately 265° C. to 280° C. for a period of time of approximately 20 hours.

3. The process of claim 1 wherein said melt processable wholly aromatic polyester is capable of forming an anisotropic melt phase at a temperature below approximately 350° C. apart from said blend and consists essentially of the recurring moieties I and II which may include substitution of at least some of the hydrogen atoms present upon an aromatic ring wherein:

I is 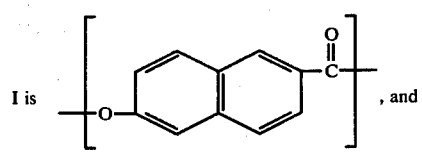, and

-continued

II is 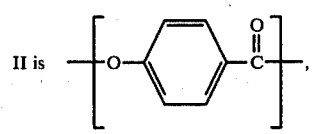, with said optional substitution if present being selected from the group consisting of an alkyl group of 1 to 4 carbon atoms, an alkoxy group of 1 to 4 carbon atoms, halogen, and mixtures of the foregoing, and wherein said wholly aromatic polyester comprises approximately 10 to 90 mole percent of moiety I and approximately 10 to 90 mole percent of moiety II.

4. The process of claim 1 wherein said melt processable wholly aromatic polyester is capable of forming an anisotropic melt phase at a temperature below approximately 325° C. apart from said blend and consists essentially of the recurring moieties I, II, and III wherein:

I is 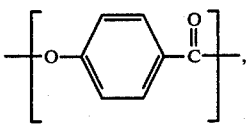,

II is 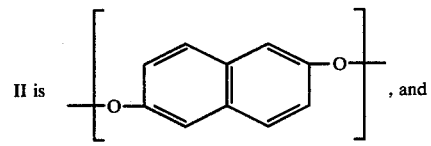, and

III is 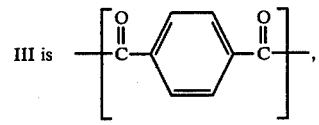, wherein said wholly aromatic polyester comprises approximately 30 to 70 mole percent of moiety I, and wherein each of said moieties of said polyester is free of ring substitution.

5. The process of claim 1 wherein said melt processable wholly aromatic polyester is capable of forming an anisotropic melt phase at a temperature below approximately 400° C. apart from said blend and consists essentially of the recurring moieties I, II, and III which may include substitution of at least some of the hydrogen atoms present upon an aromatic ring wherein:

I is

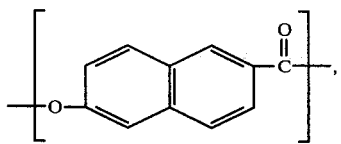

II is a dioxyaryl moiety of the formula

where Ar is a divalent radical comprising at least one aromatic ring, and

III is a dicarboxyaryl moiety of the formula

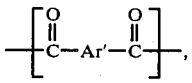

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, a phenyl group, and mixtures of the foregoing, and wherein said polyester comprises approximately 10 to 90 mole percent of moiety I, approximately 5 to 45 mole percent of moiety II, and approximately 5 to 45 mole percent of moiety III.

6. The process of claim 1 wherein the alkylene units of said polyalkylene terephthalate contain 2 to 4 carbon atoms.

7. The process of claim 6 wherein said polyalkylene terephthalate is selected from the group consisting of polybutylene terephthalate and polyethylene terephthalate.

8. The process of claim 1 wherein said polyalkylene terephthalate and said wholly aromatic polyester are intimately mixed together by melt extrusion.

* * * * *